(12) United States Patent
Saito et al.

(10) Patent No.: US 6,576,322 B2
(45) Date of Patent: Jun. 10, 2003

(54) MAGNETIC DISK

(75) Inventors: Shinji Saito, Kanagawa (JP); Takeshi Kakuta, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 9 days.

(21) Appl. No.: 09/997,871

(22) Filed: Nov. 29, 2001

(65) Prior Publication Data

US 2002/0102438 A1 Aug. 1, 2002

(30) Foreign Application Priority Data

Nov. 29, 2000 (JP) .................................. 2000-363004

(51) Int. Cl.$^7$ .............................................. G11B 5/708
(52) U.S. Cl. ...................... 428/65.3; 428/141; 428/216; 428/323; 428/694 BA; 428/694 BR; 428/694 BS
(58) Field of Search .................................. 429/216, 141, 429/694 BA, 694 BS, 65.3, 323, 694 BR

(56) References Cited

FOREIGN PATENT DOCUMENTS

| EP | 0 503 672 A2 | 9/1992 |
|----|--------------|--------|
| EP | 0 962 919 A1 | 12/1999 |

*Primary Examiner*—Stevan A. Resan
(74) *Attorney, Agent, or Firm*—Stroock & Stroock & Lavan LLP

(57) ABSTRACT

A magnetic disk comprises a support, a substantially non-magnetic lower layer, and a magnetic layer containing at least one of a ferromagnetic metal powder and a hexagonal ferrite powder and a binder, wherein the magnetic layer has a thickness of 0.02 $\mu$m to 0.5 $\mu$m, a surface having a ten-point mean height Rz measured by a non-contact surface roughness profiler of 20 nm to 50 nm, and a number of projections having a height of at least 20 nm measured by AFM of $1 \times 10^5/\text{mm}^2$ to $2 \times 10^6/\text{mm}^2$.

10 Claims, No Drawings

MAGNETIC DISK

BACKGROUND OF THE INVENTION

1. Field of the Invention

The present invention relates to a particulate magnetic disk (i.e., a magnetic disk having a magnetic layer where a magnetic powder is dispersed in a binder) having a high recording density. Particularly, the invention relates to a magnetic disk for high-density recording, having a magnetic layer and a substantially non-magnetic lower layer and the magnetic layer contains a ferromagnetic metal powder or a hexagonal ferrite powder.

2. Description of the Related Art

In the field of magnetic disks, an Mf-2HD floppy disk of 2MB using Co-modified iron oxide has been standard-mounted on a personal computer. However, at present, the data capacities to be handled have been rapidly increased, the capacity thereof has not become sufficient, and the increase of the capacity of a floppy disk has been desired.

Hitherto, as a magnetic recording medium, the magnetic recording medium obtained by coating on a non-magnetic support a magnetic layer containing an iron oxide powder, a Co-modified iron oxide powder, a $CrO_2$ powder, a ferromagnetic metal powder, or a hexagonal ferrite powder dispersed in a binder has been widely used. In these magnetic substances, it is known that the ferromagnetic metal powder and the hexagonal ferrite powder are excellent in the high-density recording characteristics.

In the case of magnetic disks, as a large capacity magnetic disk using the ferromagnetic metal powder excellent in the high-density recording characteristics, there are MF-2TD of 10MB and MF-2SD of 21MB and as a large capacity magnetic disk using the hexagonal ferrite powder, there are MF-2ED of 4MB and 21MB floptical disk, etc., but it cannot be say that they are sufficient in the capacity and the performance. Under these circumstances, various attempts have been made for improving the high-density recording characteristics. Examples thereof are shown below.

For improving the characteristics of disk-form magnetic recording medium, Japanese Patent Laid-Open No. 84418/1989 proposes that a vinyl chloride resin having an acidic group, an epoxy group, and a hydroxyl group, Japanese Patent Examined Publication No. 12374/1991 proposes that a metal powder having Hc of at least 79.6 kA/m (1000 Oe) and a specific area of from 25 to 70 $m^2/g$ is used, and Japanese Patent Examined Publication No. 28106/1994 proposes that the specific area and the magnetizing amount of a magnetic substance are determined and an abrasive is incorporated.

For improving the durability of a disk-form magnetic recording medium, Japanese Patent Examined Publication No. 85304/1995 proposed that an unsaturated fatty acid ester and a fatty acid ester having an ether bond are used, Japanese Patent Laid-Open No. 124716/1979 proposes that a non-magnetic powder having a Mohs' hardness of at least 6 and a higher fatty acid ester are incorporated, Japanese Patent Examined Publication No. 89407/1995 proposes that the volume and the specific area of pores containing abrasives are established to be from 0.005 to 0.25 $\mu m$, Japanese Patent Laid-Open No. 294637/1986 proposes that a fatty acid ester having a low melting point and a fatty acid ester having a high melting point are used, Japanese Patent Examined Publication No. 36216/1995 proposes that an abrasive having particle sizes of from ¼ to ¾ to the thickness of the magnetic layer and a fatty acid ester are used, and Japanese Patent Laid-Open No. 203018/1991 proposes that a metal magnetic substance containing Al and chromium oxide are used.

As the construction of a disk-form magnetic recording medium having a non-magnetic lower layer or an interlayer, Japanese Patent Laid-Open No. 120613/1991 proposes a construction having an electrically conductive layer and a magnetic layer containing a metal powder, Japanese Patent Laid-Open No. 290446/1994 proposes a construction having a magnetic layer having a not thicker than 1 $\mu m$ and a non-magnetic layer, Japanese Patent Laid-Open No. 159337/1987 proposes a construction comprised of a carbon interlayer and a magnetic layer containing an abrasive, and Japanese Patent Laid-Open No. 290358 proposes a construction having a non-magnetic layer wherein a carbon size is regulated.

On the other hand, recently, a disk-form magnetic recording medium comprised of a thin-layer magnetic layer and a functional non-magnetic layer has been developed, and floppy disks of 100 MB class have been appeared. As the floppy disks showing these characteristics, Japanese Patent Laid-Open No. 109061/1993 proposes a construction having a magnetic layer having Hc of 111.4 kA/m (1400 Oe) and a thickness of not thicker than 0.5 $\mu m$ and a non-magnetic layer containing electrically conducive particles, Japanese Patent Laid-Open No. 197946/1993 proposes a construction containing an abrasive larger than the thickness of the magnetic layer, Japanese Patent Laid-Open No. 290354/1993 proposes a construction in which the thickness of the magnetic layer is not thicker than 0.5 $\mu m$, the thickness fluctuation of the magnetic layer thickness is restrained within ±15%, and the surface electric resistance is regulated, and Japanese Patent Laid-Open No. 68453/1994 proposes a construction in which two kinds of abrasives each having a different particle size are contained and the amounts of the abrasives are regulated.

Also, in Japanese Patent Laid-Open No. 52541/1994, a magnetic recording medium containing at least one kind of alumina, chromium oxide, and diamond as an abrasive is shown and it is described that by adding the powder of a high hardness, the running stability of the magnetic recording material is improved.

It is known to thin the magnetic layer for preventing lowering the reproducing output caused by the thickness loss of the magnetic layer, and, for example, Japanese Patent Laid-Open No. 182178/1993 disclose a magnetic recording medium obtained by forming a lower non-magnetic layer containing an inorganic powder dispersed in a binder on a non-magnetic support and an upper magnetic layer containing a ferromagnetic powder dispersed in a binder and a thickness of not thicker than 1.0 $\mu m$ formed on the non-magnetic layer while the non-magnetic layer is yet in a wet state.

However, with the rapid increases of the capacity and the recording density of a magnetic disk, even by the above-described techniques, it has become difficult to obtain satisfactory characteristics.

Particularly, since in the case of high-density recording, the influence of a spacing loss on the reproducing output and the half width becomes large, it is necessary to smooth the surface property of the medium surface. However, when the surface is smoothed, the friction between a head and the medium is increased, whereby the abrasion and the breakdown of the medium surface are liable to occur. Thereby, reading of data becomes impossible to cause an error. Also, the surface of the medium is smoothed, the inter-medium friction is increased and the slipping property is deteriorated, whereby there are problems that not only handling in the production process becomes difficult but also the medium sticks to each other.

SUMMARY OF THE INVENTION

An object of the present invention provides a magnetic disk for high-density recording, which has the improved electromagnetic characteristics, and particularly the greatly improved high-density recording characteristics, does not generate the data loss by breaking of the magnetic layer in head running, does not generates blocking, etc., and can be easily produced.

The present invention is attained by the following (1) to (6).

(1) A magnetic disk having formed on a support a lower layer, which is substantially non-magnetic, and formed thereon a magnetic layer containing a ferromagnetic metal powder or a hexagonal ferrite powder dispersed in a binder, wherein the thickness of the magnetic layer is from 0.02 to 0.5 $\mu$m the ten-point mean height Rz of the magnetic layer surface measured by a non-contact surface roughness profiler is at least 20 nm and not higher than 50 nm, and the number of projections having a height of at least 20 nm measured by AFM is at least $1\times10^5$/mm$^2$ and not more than $2\times10^6$/mm$^2$.

(2) The magnetic disk described in (1) wherein the number of projections having a height of at least 20 nm measured by AFM is at least $3\times10^6$/mm$^2$ and not more than $1\times10^6$/mm$^2$.

(3) The magnetic disk described in (1) or (2) wherein Rz is at least 20 nm and not higher than 30 nm (4) The magnetic disk described in (1) to (3) wherein the magnetic layer contains carbon black having a mean particle size of from 0.04 to 0.12 $\mu$m.

(5) The magnetic disk described in (1) to (4) wherein the crystallite size of the ferromagnetic metal powder is from 80 to 160 angstroms.

(6) The magnetic disk described in (1) to (5) wherein the amount of the binder of the magnetic layer is from 10 to 22 parts by weight to the ferromagnetic metal powder.

The number of the projections having a height of at least 20 nm is the mean value of the values measuring the number of the projections in the area of 30 $\mu$m×30 $\mu$m about optional five portions on a magnetic disk using an atomic force microscope (AFM) NanoScope III manufactured by Digital Instrumental Co.

About Rz, using TOPO-3D manufactured by WYKO Co., ten projections were selected in order of higher height in the area of 250 $\mu$m×250 $\mu$m on a magnetic disk by a MIRA method and the mean value was obtained. The measurement was carried out at optional five portions and the averaged value was employed as Rz.

DETAILED DESCRIPTION OF THE INVENTION

According to the invention, in a magnetic disk obtained by forming a lower layer, which is substantially nonmagnetic, on a support and a magnetic layer containing a ferromagnetic metal powder or a hexagonal ferrite powder dispersed in a bonder, by regulating that the thickness of the above-described magnetic layer is from 0.02 $\mu$m to 0.5 $\mu$m, the ten point mean height Rz on the surface of the magnetic layer measured by a non-contact surface roughness profiler is at least 20 nm and not higher than 50 nm, and the number of projections having a height of at least 20 nm measured by AFM is at least $1\times10^5$/mm$^2$ and not more than $2\times10^6$/mm$^2$ (preferably at least $3\times10^5$/mm$^2$ and not more than $1\times10^5$/mm$^2$), the magnetic disk having both the excellent high-density characteristics and the excellent durability, and having the greatly improved reliability in the high-density recording region can be obtained. The Rz is preferably at least nm and not higher than 30 nm.

In the invention, the lower layer, which is substantially non magnetic, means that the layer may have a magnetism to the extent of not contribute to recording, and hereinafter, is simply called the lower layer or the non-magnetic layer.

As the result of intensely investigating the relation of the electromagnetic characteristics and the surface form (surface shape), the relation of the friction coefficient and the surface form, and the relation of the running durability and the surface form in a magnetic disk obtained by forming the lower layer and a thin magnetic layer on the lower layer, the present inventors have found that the electromagnetic characteristics are determined by the mean value of the highest ten (10) projections in the total projection in a specific area, that is by Rz, and the friction coefficient and durability are determined the number of very small projections smaller than the above-described ten projections.

The reasons that the magnetic recording medium of the invention has the high electromagnetic characteristics, the low friction coefficient, and the excellent durability have not yet been clarified, but since in a magnetic disk, a head is incorporated in a slider, it is considered that the space between the head and the medium, which gives a large influence on the electromagnetic characteristics, is determined the relatively few high projections on the surface of the medium. One projection is insufficient to keep the space, and on the contrary, numberless projections are unnecessary for keeping the space. Also, that Rz has a high relation with the electromagnetic characteristics is considered to show that about ten high projections determine the space between the slide and the medium.

Now, Rz is the value obtained by measuring by non-contact system the area of 250 $\mu$m square corresponding to about the rail width of the slider using TOPO-3D manufactured by WYKO Co.

On the other hand, it is supposed that when the number of very small projections is increased, the point-contact points of the medium each other are increased and the occurrence of a face-contact can be prevented, whereby not only the friction is lowered and the production of the magnetic recording medium becomes easy but also the running durability is improved. The height of the very small projections is measured by AFM in the area of 30 $\mu$m square and by controlling the number of projections as having the height of at least 20 nm, the largest effect is obtained.

For controlling the number of the very small projections to a definite number, the degree of influence differs by the composition and the thickness of the coated layer, but it is effective to control the projections on the surface of the support by the particle sizes and the amount of a filler of the support. Also, the non-magnetic lower layer gives influences on the form of the surface of the magnetic layer, and by controlling the particle sizes and shape of the non-magnetic powder used for the lower layer, very fine projections can be formed on the surface of the magnetic layer. About the magnetic layer, by controlling the particle size of the magnetic substance and the particle sizes of solid non-magnetic powders such, carbon black, abrasives, etc., very small projections can be formed on the surface thereof.

Also, when the amount of the binder is reduced, the number of projections is increased, and this is because the shapes of the solid powders are liable to appear as the surface form of the medium.

For controlling Rz, it is effective that the number of course projections of the support is reduced, that about the magnetic substance, the solid non-magnetic powder in the magnetic layer, and the nonmagnetic powder of the lower layer, the particle distribution is sharp and particularly, course particles are less, that the component mixture is sufficiently dispersed using zirconia beads, etc., and that the surface of the magnetic layer is surface treated with an abrasive tape, etc., to previously scrape off course projections, etc.

The coercive force (Hc) of the magnetic layer of the magnetic disk of the invention is preferably at least 143.3 kA/m (1800 Oe), more preferably at least 159.2 kA/m (2000 Oe), and particularly preferably from 183.1 to 278.6 kA/m (2300 to 3500 Oe). When the Hc is lower than 143.3 kA/m (1800 Oe), high-density recording is hard to attain.

The centerline average surface roughness (Ra) of the magnetic layer of the invention is preferably from 0.5 to 7.0 nm by a 3D-MIRAU method. When the Ra exceeds 7.0 nm. the spacing loss of the magnetic disk and a head becomes large, the output is lowered, noise is increased, and the medium performance of the magnetic disk of the invention cannot be obtained. On the other hand, when the Ra is less than 0.5 nm, the magnetic layer is undesirably liable to be injured by the head.

Then, the later construction, the raw materials, etc., of the magnetic recording medium of the invention are explained in detail.

Magnetic Layer

In the magnetic disk of the invention, a lower layer and a thin magnetic layer (hereinafter, is sometimes referred to as "upper layer" or "upper magnetic layer" may be form on one surface or both the surfaces of a support. The upper layer may be formed after coating the lower layer while the lower layer is in a wet state (W/W) or after drying the lower layer (W/D). From the point of the productivity, simultaneous coating or successive wet coating is preferred but in the case of the magnetic disk, the disk formed by coating the magnetic layer after drying the lower layer can be sufficiently used. In the double layer construction of the invention, since the upper layer/lower layer can be simultaneously formed by simultaneous coating or successive wet coating (W/W), the surface treatment step such as a calender step, etc., can be effectively applied and even in the very thin magnetic layer, the surface roughness can be improved.

Magnetic Powder

As the ferromagnetic powder used for the upper magnetic layer of the invention, a ferromagnetic metal layer or a hexagonal ferrite powder is used.

Ferromagnetic Metal Powder

As the ferromagnetic metal powder, a ferromagnetic alloy powder made of α-Fe as the main constituent is preferred These ferromagnetic metal powders may contain, in addition to the definite atom(s), Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr, B, etc., in addition to the definite atoms. Particularly, the metal powder preferably contains at least one of Al, Si, Ca, Y, Ba, La. Nd, Sm, Co, Ni, and B in addition to α-Fe, and more preferably contains at least one of Co, Y, Al, Nd, and Sm.

The content of Co is preferably from 0 to 40 atom %, more preferably from 15 to 35 atom %, and far more preferably from 20 to 35 atom %.

The content of Y is preferably from 1.5 to 12 atom %, more preferably from 3 to 10 atom %, and more preferably from 4 to 9 atom %.

The content of Al is preferably from 1.5 to 30 atom %, more preferably from 5 to 20 atom %, and far more preferably from 8 to 15 atom %.

These ferromagnetic metal powders may be previously treated with a dispersing agent, a lubricant, a surface active agent, an antistatic agent, etc., as described later, before dispersing in a binder resin. Practically, these ferromagnetic metal powders are described in Japanese Patent Examined Publication Nos. 14090/1969, 18372/1971, 22062/1972, 22513/1972, 28466/1971, 38755/1971, 4286/1972, 12422/1972, 17284/1972, 18509/1972, 18573/1972, 10307/1964, and 39639/1971, U.S. Pat. Nos. 3,026,215, 3,031,341, 3,100,194, 3,242,005, and 3,389,014, etc.

The ferromagnetic metal powder may contain a small amount of a hydroxide or an oxide. The ferromagnetic metal powders used in the invention may be obtained by known production methods as described below. That is, there are a method of reducing with a composite organic acid salt (mainly, an oxalate) and a reducing gas such as hydrogen, etc., a method of obtaining Fe particles or Fe—Co particles by reducing iron oxide with a reducing gas such as hydrogen, etc., a method of thermally decomposing a metal carbonyl compound, a method of reducing a ferromagnetic metal by adding a reducing agent such as sodium borohydride, a hypophosphite, or hydrazine to an aqueous solution of the ferromagnetic metal, a method of obtaining the powder of a metal by evaporating the metal in an inert gas at a low pressure, etc.

The ferromagnetic metal powder thus obtained is subjected to a known slow oxidation treatment, that is, the ferromagnetic metal powder subjected to a method of immersing in an organic solvent followed by drying, a method of immersing in an organic solvent, introducing an oxygen-containing gas into the mixture to form an oxide film on the surface of the metal powder followed by drying, or a method of forming an oxide film on the surface of the metal powder by controlling the partial pressures of an oxygen gas and an inert gas without using an organic solvent, etc., can be used.

The specific surface area ($S_{BET}$) by a BET method of the ferromagnetic metal powder contained in the magnetic layer of the invention is usually from 45 to 80 $m^2/g$ and preferably from 50 to 70 $m^2/g$. When the specific area is smaller than 45 $m^2/g$, a noise is increased and when the specific area is larger than 80 $m^2/g$, the surface property is undesirably hard to obtain.

The crystallite size of the ferromagnetic metal powder is preferably from 80 to 160 angstroms, more preferably from 100 to 140 angstroms, and far more preferably from 110 to 140 angstroms.

The average long axis length of the ferromagnetic metal powder is preferably from 30 to 150 nm, and more preferably from 30 to 100 nm.

The acicular ratio of the ferromagnetic metal powder is preferably from 3 to 15, and more preferably from 5 to 12. The saturation magnetization (σs) of the ferromagnetic metal powder is usually from 100 to 200 $A·m^2/kg$ (emu/g), and preferably from 120 to 180 $A·m^2/kg$ (emu/g).

The water content of the ferromagnetic metal powder is preferably from 0.01 to 2% by weight. It is preferred that according to the kind of the binder, the water content is optimized. It is preferred that the pH of the ferromagnetic metal powder is optimized by the combination with the binder used. The range of the pH is usually from 4 to 12, and preferably from 6 to 10.

If necessary, the ferromagnetic meal powder may be subjected to a surface treatment with Al, Si, P, or the oxide thereof. The amount thereof is usually from 0.1 to 10% by weight to the ferromagnetic metal powder and when the surface treatment is applied, the adsorption of a lubricant such as a fatty acid, etc., preferably becomes 100 mg/m$^2$ or lower. As the case may be, the ferromagnetic metal powder contains an inorganic ion such as Na, Ca, Fe, Ni, Sr, etc. It is essentially preferred that such an ion does not exist, but when the content thereof is not more than 200 ppm, they give less influences on particular the characteristics of the ferromagnetic metal powder.

Also, it is preferred that the ferromagnetic metal powder used in the invention has pores as less as possible, and the value thereof is preferably not more than 20% by volume, and more preferably not more than 5% by volume. Also, the shape of the ferromagnetic metal powder may be acicular, rice-grain form, or spindle form.

The SFD (switching field distribution of the ferromagnetic metal powder itself is preferably as small as possible and is preferably not larger than 0.8. In addition, when SFD is not larger than 0.8, the electromagnetic characteristics are good, the output is high, also, the magnetic inversion is sharp and peak shift becomes less, which are suitable for high-density digital magnetic recording. For reducing the distribution of Hc, there are a method of improving the particle size distribution of goethite in a ferromagnetic metal powder, a method of preventing sintering, etc.

Hexagonal Ferrite Powder

A hexagonal ferrite includes a barium ferrite, a strontium ferrite, a lead ferrite, a calcium ferrite and various kinds of the substitution products of them, the Co-substitution products, etc. Practically, there are the barium ferrite and strontium ferrite of a magnetoplumbite type, a magnetoplumbite type ferrite in which the particle surfaces are covered by spinel, and further the barium ferrite and strontium ferrite of a composite magnetoplumbite type partially containing a spinel phase, etc., and they may contain Al, Si, S, NT, Sn, Ti, V, Cr, Cu, Y, Mo, Rh, Pd, Ag, Sb, Te, W, Re, Au, Bi, La, Ce, Pr, Nd, P, Co, Mn, Ni, B, Ge, etc., in addition to the definite atoms. In general, the hexagonal ferrites added with Co—Zn, Co—Ti, Co—Ti—Zr, Co—Ti—Zn, Ni—Ti—Zn, Nb—Zn—Co, Sn—Zn—Co, Sn—Co—Ti, Nb—Zn, etc., can be used. About the particle sizes, in a hexagonal plate diameter, the mean plate diameter is preferably 10 to 55 nm, more preferably from 10 to 45 nm, and particularly preferably from 10 to 40 nm.

Particularly, in the case of reproducing by a magnetic resistance head (MR head) for increasing the truck density, it is necessary to lower a noise and the mean plate diameter is preferably not larger than 45 nm but when the mean plate diameter is smaller than 10 nm, a stable magnetization is not desired owing to heat swing. When the mean plate diameter is larger than 55 nm, a noise is increased. That is, both cases are unsuitable for high-density magnetic recording. The plate form ratio (plate diameter/plate thickness) is desirably from 1 to 15 and preferably from 1 to 7. When the plate form ratio is small, the packing property in the magnetic layer becomes high but a sufficient orientation is not obtained. When the plate form ratio is larger than 15, a noise becomes larger by stacking among particles. The specific area of the particle size range by a BET method shows from 30 to 200 m$^2$/g. The specific area generally coincides with the arithmetical calculated value from the particle plate diameter and the plate thickness. The distribution of the particle plate diameter plate thickness is preferably as narrow as possible. Although the numeration is difficult, the distribution can be compared by measuring about 500 particles at random by a particle TEM (transmission type electron microscope) photograph. The distribution is, in many cases, not a regular distribution but by calculating and when the distribution is shown by a standard deviation to the mean size, σ/mean particle size=0.1 to 1.5. For obtaining the sharp particle size distribution, it has been carried out to make the particle-forming reaction system as uniform as possible and also applying a distribution improving treatment to the particles. For example, a method of selectively dissolve very fine powders in an acid solution.

Carbon Black

The magnetic layer can, if desired, contain carbon black. As the carbon black used in the invention, furnace for rubber, thermal for rubber, black for color, electroconductive carbon black, acetylene black, etc., can be used.

It is preferred that the specific surface of carbon black is usually from 5 to 500 m$^2$/g, and the DBP oil absorption thereof is from 10 to 400 ml/100 g, the mean particle size from 5 nm to 300 nm, the pH is from 2 to 10, the water content is from 0.1 to 10%, and the tap density is from 0.1 to 1 g/ml. The mean particle size is particularly preferably from 0.04 μm (40 nm) to 0.12 μm (120 nm).

Practical examples of carbon black used for the magnetic layer in the invention include BLACKPEARLS 2000, 1300, 1000, 900, 905, 800, and 700, VULCAN XC-72 manufactured by Cabot corporation; #80, #60, #55, #50, and 35 manufactured by Asahi Carbon K.K.; #2400B, #2300, #900, #1000, #30, #40 and #10B manufactured by Mitsubishi Chemical Corporation; CONDUCTEX SC. RAVEN 150, 50, 40, 15, and RAVEN-MT-P manufactured by Columbia Carbon Corporation; KETJENBLACK EC, manufactured by Akzo Co., etc.

Carbon black used in the invention may be surface treated with a dispersing agent, or the surface thereof may be grafted with a resin, or a part of the surface may be graphitized.

Particularly, as the case of carbon black contained in the non-magnetic layer, the carbon black treated with at least one kind selected from carboxylic acid amine salts and phosphoric acid ester amine salts, and having a mean particle size of from 40 to 120 nm is preferred.

Also, before adding carbon black to the magnetic coating material, the carbon black may be previously dispersed with a binder. These carbon blacks may be used singly or a combination of them.

In the case of using carbon black, the carbon black can be used in an amount of from 0.1 to 30% by weight to the amount of the ferromagnetic metal powder. Carbon black has the functions of the static prevention, the reduction of the friction coefficient, imparting the light shading property, the improvement of the film strength, etc., of the magnetic layer, and they differ according to the carbon black used. Accordingly, it is, as a matter of course, possible to change the kind, the amount, and the combination of the carbon blacks between the upper layer and the lower layer to properly use the carbon blacks according to the purposes based on the various characteristics such as the particle sizes, the oil absorptions, the electric conductivities, the pH, etc. Rather, they must be optimized in each layer. The carbon black, which can be used for the magnetic layer of the invention, can refer to, for example, "Carbon Black Handbook" edited by the carbon black society of Japan.

Abrasives

As the abrasives, which can be used in the invention, known materials having the Mohs' hardness of at least 6, such as, α-alumina of the α ratio of at least 90%, β-alumina, diamond, silicon carbide, chromium oxide, cerium oxide, α-iron oxide, corundum, silicon nitride, silicon carbide, titanium carbide, titanium oxide, silicon dioxide, boron nitride are mainly used singly or as a combination of them. Also, the composite material of the abrasives with each other (an abrasive surface treated with other abrasive) may be used. As the case may be, the abrasive contains a compound or an element in addition to the main ingredient but when the content of the main ingredient is at least 90%, the effect of the abrasive is not changed. The mean particle size of the abrasives is preferably from 0.01 to 1 μm, and particularly for increasing the electromagnetic characteristics, it is preferred that the particle size distribution thereof is narrow. Also, for improving the durability, if necessary, the abrasive can be combined with other abrasive having different particle sizes, or even in a single abrasive, by widening the particle size distribution, the same effect can be imparted.

Also, it is preferred that the tap density thereof is from 0.3 to 1.5 g/cc, the water content is from 0.1 to 5% by weight, the pH is from 2 to 11, and the specific area is from 1 to 40 $m^2/g$.

The shape of the abrasives used in the invention may be acicular, spherical, or a die-shape, but an abrasive having a corner at a part of the shape is preferred because of showing a high abrasive power. Practical examples of the abrasives, which can be used in the invention, include AKP-10, AKP-20, AKP-30, AKP-50, HIT-20, HIT-30, HIT-50, HIT-60A, HIT-50G, HIT-70, HIT-80, HIT-82, and HIT-100, manufactured by Sumitomo Chemical Company, Ltd.; ERC-DEM, HP-DBM, and HPS-DBM manufactured by Reynolds Co.; WA10000, manufactured by Fujimi kenmazai K.K.; UB20, manufactured by Kamimura Kogyo K.K.; G5, Chromex U2, and Chromex U1, manufactured by Nippon Chemical Industrial Co., Ltd.; TF-100 and TF-140, manufactured by Toda Kogyo K.K.; β-Random Ultrafine, manufactured by IBIDEN CO., LTD.; B-3, manufactured by Showa Kogyo K.K., etc. If necessary, the abrasives can be added to the lower layer. By adding to the lower layer, the surface form can be controlled and the projected state of the abrasives can be controlled. The particle sizes and the amounts of the abrasives, which are added to the magnetic layer and the lower layer, must be, as a matter of course, established to the optimum values.

Lower Layer

Then, the detailed contents of the lower layer are explained.

About the lower layer of the magnetic disk of the invention, there is no restriction if the layer is substantially non-magnetic, and usually, there is a lower layer made of at least a resin and containing a powder such as an inorganic powder or an organic powder dispersed in a resin.

The inorganic powder is usually preferably a nonmagnetic powder, but a magnetic powder can be used in the range that the lower layer is substantially non magnetic. The term that the lower layer is substantially non magnetic means that the lower layer is allowed to have a magnetism in the range of not substantially lower the electromagnetic characteristics of the upper layer. Practically, for example, this is the case that the residual magnetic flax density of the lower layer is not larger than 0.01 tesla (100 Gauss) or the coercive force is not higher than 7.96 kA/m (100 Oe).

Non-Magnetic Powder

The non-magnetic powder can be selected from, for example, inorganic compounds such as metal oxides, metal carbonates, metal sulfates, metal nitrides, metal carbides, metal sulfides, etc.

As the inorganic compound, α-alumina of the a ratio of at least 90%, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and, molybdenum disulfide are used singly or as a combination of them. The particularly preferred inorganic compounds are titanium dioxide, zinc oxide, iron oxide, and barium sulfate, and the more preferred inorganic compounds are titanium dioxide and α iron oxide from the points of the smallness of the particle distribution and having many means of imparting functions.

The mean particle size of these non-magnetic powders is preferably from 0.005 to 2 μm, and, if necessary, by combining non-magnetic powders each having different particle sizes or even a single non-magnetic powder, by widening the particle size distribution, the same effect can be imparted. The particularly preferred mean particle size of the non-magnetic powder is from 0.01 μm to 0.2 μm. Particularly, when the non-magnetic powder is a metal oxide, the mean particle size is preferably not larger than 0.08 μm, and when the non-magnetic powder is an acicular metal oxide, the mean long axis length is preferably not longer than 0.3 μm, and more preferably not longer than 0.2 μm. The tap density is usually from 0.05 to 2 g/ml, and preferably from 0.2 to 1.5 g/ml. The water content of the non-magnetic powder is usually from 0.1 to 5% by weight, preferably from 0.2 to 3% by weight, and far more preferably from 0.3 to 1.5% by weight. The pH of the non-magnetic powder is usually from 2 to 11 and particularly preferably from 3 to 10.

The specific area of the non-magnetic powder is usually from 1 to 100 $m^2/g$, preferably from 5 to 80 $m^2/g$. and more preferably from 10 to 70 $m^2/g$. The crystallite size of the non-magnetic inorganic powder is preferably from 0.004 μm to 1 μm, and more preferably from 0.04 to 0.1 μm. The oil absorption using dibutyl phthalate (DBP) is from 5 to 100 ml/100 g, preferably from 10 to 80 ml/100 g, and more preferably from 20 to 60 ml/100 g. The specific gravity is usually from 1 to 12, and preferably from 3 to 6. The shape of the non-magnetic inorganic powder may be any of acicular, spherical, a polyhedron, and a plane shape. The Mohs' hardness is preferably at least 4 and not higher than 10. The SA (stearic acid) absorption is usually from 1 to 20 μmol/$m^2$, preferably from 2 to 15 μmol/$m^2$, and far more preferably from 3 to 8 μm.

It is preferred that on the surfaces of the non-magnetic powders exists $Al_2O_3$, $SiO_2$, $TiO_2$, $ZrO_2$, $SnO_2$, $Sb_2O_3$, ZnO, or $Y_2O_3$ as the result of applying a surface treatment to the surface of non-magnetic powder. Particularly preferred oxides for the dispersibility are $Al_2O_3$, $SiO_2$, $TiO_2$, and $ZrO_2$, but more preferred oxides are $Al_2O_3$, $SiO_2$, and $ZrO_2$. They can be used as a combination of them and or can be used singly.

Also, according to the purpose, coprecipitated surface treated layer may be used, or a method of applying silica after applying alumina onto the surface layer or a method of applying alumina after applying silica onto the surface layer can be employed. Also, the surface treated layer may be a porous layer according to the purpose but a uniform and dense layer is generally preferred.

Practical examples of the non-magnetic inorganic powder used for the lower layer of the invention include Nanotite, manufactured by SHOWA DENKO K.K.; HIT-100 and ZA-G1, manufactured by Sumitomo Chemical Company, Limited; DPN-250, DPN-250BX, DPN-245, PPN-270BX, DPB-550BX, and DPN-SA1, and DEN-SA3; manufactured by Toda Kogyo K.K.; titanium oxides, TTO-51B, TTO-55A, TTO-55B, TTO-55C, TTO-55S, TTO-55D, SN-100, $\alpha$-hematite E270, E271, E 300, and E303, manufactured by ISHIHARA SANGYO KAISHA, LTD.; titanium oxides STT-4D, STT-30D, STT-30, and STT-65C, and $\alpha$-hematite $\alpha$40, manufactured by Titan Kogyo K.K.; MT-100S, MT-100T, MT-150W, MT-500B, MT-600B, MT-100F, and MT-500HD, manufactured by TAYCA CORPORATION; FINEX-26, BF-1, BF-10, BF-20, and ST-M, manufactured by Sakai Chemical Industry Co., Ltd.; DEFIC-Y and DEFIC-R, manufactured by DOWA MINING CO., LTD.; AS2BM and TiO2P25, manufactured by Nippon Aerosil K.K.; 100A and 500A, manufactured by Ube Industries Ltd.; and the burned products of them. The particularly preferred non-magnetic powders are titanium dioxide and $\alpha$-iron oxide.

By mixing carbon black with the lower layer, the surface electric resistance (Rs) can be lowered, which is a known effect, and the light transmittance can be reduced, as well as a desired micro Vickers hardness can be obtained. Also, by incorporating carbon black in the lower layer, the effect of the adhesive storage can be obtained. As the kind of carbon black, furnace for rubber, thermal for rubber, black for color, acetylene black, etc., can be used. The following characteristics of carbon black of the lower layer shall be optimized according to the desired effects, and by using together, better effects are sometimes obtained.

The specific surface of carbon black used for the lower layer is usually from 100 to 500 m$^2$/g. and preferably from 150 to 400 m$^2$/g, and the DBP oil absorption thereof is usually from 20 to 400 ml/100 g, and preferably from 30 to 200 ml/100 g. The mean particle size of carbon black is usually from 5 nm to 80 nm, preferably from 10 to 50 nm, and more preferably from 10 to 40 nm. Usually, it is preferred that the pH of carbon black is from 2 to 10, the water content is from 0.1 to 10% by weight, and the tap density is from 0.1 to 1 g/ml. Practical examples of carbon black used in the invention include BLACKPEARLS2000, 1300, 1000, 900, 800, 880, 700, VULCAN XC-72, manufactured by Cabot Corporation; #3050B, 3150B, 3250B, #3750B, #3950B, #950, #650, #970, #850B, MA-600, MS-230, #4000, and #4010; manufactured by Mitsubishi Chemical Corporation; CONDUCTEX SC. RAVEN 8800, 8000, 7000, 5750, 5250, 3500, 2100, 2000, 1800, 1500, 1255, and 1250, manufactured by Columbia Carbon Corporation; KETJENBLACK EC, manufactured by Akzo Co, etc. Carbon black used in the invention may be surface treated with a dispersing agent, or the surface thereof may be grafted with a resin, or a part of the surface may be graphitized. The carbon black can be used in the range of not exceeding 50% by weight to the above-described inorganic powder and in the range of not exceeding 40% of the total amount of the non-magnetic layer. These carbon blacks can be used singly or as a combination of them. Carbon black, which can be used for the lower layer, can refer to, for example, "Carbon Black Handbook" edited by Carbon black Society of Japan.

Also, according to purposes, an organic powder can be added to the lower layer. Examples of the organic powder include an acryl-styrene-base resin powder, a benzoguanamine resin powder, a melamine-base resin powder, and phthalocyanine-base pigment, but a polyolefin-base resin powder, a polyester-base resin powder, a polyamide-base resin powder, a polyimide-base powder, and a polyethylene fluoride resin powder can be also used. As the production method thereof, the methods described in Japanese Patent Laid-open Nos. 18564/1987 and 255827/1985 can be used.

Binder

In regard to the kinds and amounts of the binders, which are used for the magnetic layer and the lower layer of the invention, conventionally known techniques can be applied.

As the minders, conventionally known thermoplastic resins, thermosetting resins, reaction type resins and mixtures of them can be used.

The thermoplastic resin has a glass transition temperature of usually from −100 to 150° C., a number average molecular weight of usually from 1,000 to 200,000, and preferably from 10,000 to 100,000, and the polymerization degree of usually from about 50 to 1,000.

Examples of the thermoplastic resin include polymers or copolymers containing the constituting units induced from the monomers such as vinyl chloride, vinyl acetate, vinyl alcohol, maleic acid, acrylic acid, an acrylic acid ester, vinylidene chloride, acrylonitrile, methacrylic acid, a methacrylic acid ester, styrene, butadiene, ethylene, vinyl butyral, vinyl acetal, vinyl ether, etc., as the constituting unit; a polyurethane resins, and various kinds of rubber-base resins.

Also, the thermosetting resin or the reaction-type resin includes a phenol resin, an epoxy resin, a polyurethane setting type resin, a urea resin, a melamine resin, an alkyd resin, an acrylic reactive resin, s formaldehyde resin, silicone resin, an epoxy-polyamide resin, a mixture of a polyester resin and an isocyanate prepolymer, a mixture of polyester polyol and polyisocyanate, a mixture of polyurethane and polyisocyanate, etc.

These resins are described in detail in "Plastic Handbook#" published by Asakura Shoten. Also, a known electron ray-setting type resin can be used for each layer. These examples and the production methods are described in detail in Japanese Patent Laid-Open No. 256219/1987.

The above-described resins can be used singly or as a combination thereof, and as the preferred examples, there are a combination of a polyurethane resin and at least one kind selected from a vinyl chloride resin, a vinyl chloride-vinyl acetate resin, a vinyl chloride-vinyl acetate-vinyl alcohol resin, and a vinyl chloride-vinyl acetate-maleic anhydride copolymer; and combinations of the above-described combinations with polyisocyanate.

As the structure of the polyurethane resin, the known structure such as polyester polyurethane, polyether polyurethane, polyether polyester polyurethane, polycarbonate polyurethane, polyester polycarbonate polyurethane, polycaprolactone polyurethane, etc., can be used.

About all the binders described above, for obtaining the more excellent dispersibility and durability, it is preferred to use the binder having introduced by a copolymerization or an addition reaction at least one polar group selected from —COOM, —SO$_3$M, —OSO$_3$M, —P=O(OM)$_2$, —O—P=O (OM)$_2$ (wherein, M described above shows a hydrogen atom or an alkali metal base), —OH, —NR$_2$, —N$^+$R$_3$ (wherein, R shows a hydrocarbon group), an epoxy group, —SH, —CN, etc.

The amount of such a polar group is from $10^{-1}$ to $10^{-8}$ mol/g, and preferably from $10^{-2}$ to $10^{-6}$ mol/g.

Practical examples of these binders include VAGH, VYHH, VMCH, VAGF, VAGD, VROH, VYES, VYNC, VMCC, XYHL, XYSG, PKHH, PKHJ, PKHC, and PKFE, manufactured by Union Carbide Corporation; MPR-TA, MPR-TA5, MPR-TAL, MPR-TSN, MPR-TMF, MPR-TS, MPR-TM, and MPR-TAO, manufactured by Nissin Kagaku Kogyo K.K.: 1000W, DX80, DX81, DX82, DX83, and 100FD, manufactured by DENKI KAGAKU KOGYO KABUSHIKI KAISHA; MR-104, MR-105, MR110, MR100, MR555, and 400X-110A, manufactured by ZEON CORPORATION; Nipporan N2301, N2302, and 2304, manufactured by NIPPON POLYURETHANE INDUSTRY CO., LTD., Pandex T-5105, T-R3080, and T-5201: Barnoc D-400, and D-210-80; and Crysbon 6109 and 7209; manufactured by DAINIPPON INK & CHEMICALS, INC.; Bylon UR8200, UR8300, UR-8700, RV530, and RV280; manufactured by TOYOBO CO., LTD., Daipheramine 4020, 5020, 5100, 5300, 9020, 9022, and 7020, manufactured by DAINICHISEIKA COLOR & CHEMICALS MFG. CO., LTD.; MX5004, manufactured by Mitsubishi Chemical Corporation; Sanprene SP-150, manufactured by SANYO CHEMICAL INDUSTRIES, LTD.; and Saran F310 and F210, manufactured by ASAHI KASEI CORPORATION.

The binders used for the lower layer and the magnetic layer are used in the range of from 5 to 50% by weight, and preferably from 10 to 22% by weight to the non-magnetic powder in the lower layer and the ferromagnetic metal powder in the magnetic layer, respectively.

It is preferred to combine from 5 to 30% by weight a vinyl chloride-base resin, from 2 to 20% by weight a polyurethane resin, and from 2 to 20% by weight polyisocyanate, but, for example, when by very small amount of dechloniation, a corrosion of a head occurs, polyurethane only or polyurethane and isocyanate only can be used.

In the case of using polyurethane, it is preferred to use the polyurethane having a glass transition temperature of from −50 to 150° C., and preferably from 0 to 100° C., a breaking extension of from 100 to 2000%, a breaking stress of from 0.05 to 10 Kg/mm$^2$ (0.49 to 98 MPa), and a yield point of from 0.05 to 10 kg/mm$^2$ (0.49 to 98 MPa).

The magnetic disk of the invention is fundamentally composed of the lower layer and a magnetic layer but the lower layer and/or the magnetic layer may be made of double layers. Accordingly, the amount of the binder, the amounts of the vinyl chloride-base resin, the polyurethane resin, the polyisocyanate and other resins in the binder, the molecular weight and the amount of the polar group of each resin forming the magnetic layer(s), and the physical characteristics of the resins described above can, if necessary, changed, as a matter of course, in each layer, and rather, they shall be optimized in each layer, and known techniques about multilayer structure can be applied. For example, in the case of changing the amount of the binder in each layer, for reducing the occurrence of injuries on the surface of the magnetic layer, the amount of the binder of the magnetic layer is increased, for improving the head touch to a head, the amount of the binder of the lower layer is increased to give flexibility to the magnetic layer. Anyhow, at the application, it is, as a matter of course, preferred to optimize in the range of obtaining the effects of the invention.

As the polyisocyanate, isocyanates such as tolylene diisocyanate, 4,4'-diphenylmethane diisocyanate, hexamethylene diisocyanate, xylylene diisocyanate, naphthylene-1,5-diisocyanate, o-toluidine dilsocyanate, isophorone diisocyanate, triphenylmethane triisocyanate, etc.; the reaction products of these isocyanates and polyalcohols, and the polyisocyanates formed by the condensation of the isocyanates can be used. These isocyanates are commercially available as the trade names of Coronate L, Coronate HL, Coronate 2030, and Coronate 2031, Millionate MR and Millionate MTL, manufactured by NIPPON POLYURETHANE INDUSTRY CO., LTD.; Takenate D-102, Takenate D-110N, Takenate D-200, and Takenate D-202, manufactured by Takeda Chemical Industries, Ltd.; Desmodur L, Desmodur IL, Desmodur N, and Desmodur HL, manufactured by Sumitomo Bayer Co., etc. They can be used singly or a combination of two or more kinds for utilizing the difference of the setting reactions for each layer.

Additives

As the additives, which are used for the magnetic layer and the lower layer of the magnetic disk of the invention, the additives having a lubricating effect, an antistatic effect, a dispersing effect, a plasticizing effect, etc., are used.

As such additives, for example, molybdenum disulfide, tungsten disulfide graphite, boron nitride, fluorinated graphite, a silicone oil, silicones having polar groups, fatty acid-modified silicones, a fluorine-containing silicone, a fluorine-containing alcohol, polyolefins, polyglycols, an alkylphosphoric acid ester and the alkali metal salts thereof, an alkylsulfuric acid ester and the alkali metal salts thereof, a polyphenyl ether, phenylphosphonic acid, phenylphosphinic acid, aminoquinones, various silane coupling agents, titanium coupling agents, a fluorine-containing alkylsulfuric acid ester and the alkali metal salts thereof, monobasic fatty acids having from 10 to 24 carbon atoms (which may contain an unsaturated bound or may be branched) and the metal salts thereof (Li, Na, K, Cu, etc.), monohydric, dihydric, trihydric, tetrahydric, pentahydric, and hexahydric alcohols having from 12 to 22 carbon atoms (which may contain an unsaturated bond or may be branched), alkoxy alcohols having from 12 to 22 carbon atoms (which may contain an unsaturated bond or may be branched); monofatty acid esters, di-fatty acid esters, or tri-fatty acid esters comprised of monobasic fatty acids having from 10 to 24 carbon atoms (which may contain an unsaturated bond or may be branched) and one of monohydric, dihydric, trihydric, tetrahydric, pentahydric, and hexahydric alcohols having from 2 to 12 carbon atoms (which may contain an unsaturated bond or may be branched); the fatty acid ester of the monoalkyl ether of an alkylene oxide polymer; fatty acid amides having from 8 to 22 carbon atoms; aliphatic amines having from 8 to 22 carbon atoms, etc., can be used.

As the practical examples of them, there are following compounds.

Examples of the fatty acid include capric acid, caprylic acid, lauric acid, myristic acid, palmitic acid, stearic acid, behenic acid, oleic acid, elaidic acid, linolic acid, linolenic acid, and stearic acid.

Examples of the esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palpitate, isohexadecyl stearate, oleyl oleate, dodecyl stearate, tridecyl stearate, oleyl erucide, neopentyl glycol didecanoate, ethylene glycol dioleyl, etc.

Examples of the alcohols include oleyl alcohol, stearyl alcohol, lauryl alcohol, etc.

Nonionic surface active agents of alkylene oxide-base, glycerol-base, glycidol-base, alkylphenol ethylene oxide addition product, etc.; cationic surface active agents such as cyclic amines, ester amides, quaternary ammonium salts, hydantoin derivatives, heterocyclic compounds, phosphoniums, sulfoniums, etc.; anionic surface active agents having an acid group, such as a carboxylic acid, sulfonic acid, phosphoric acid, a sulfuric acid ester group, a phosphoric acid ester group, etc.; and amphoteric surface active agents such as amino acids, aminosulfonic acids, sulfuric acid or phosphoric acid esters of amino alcohol, alkylbetaine-type, etc., can be used. These surface active agents are described in detail in "Surface Active Agent Handbook" (published by Sangyo Tosho K.K.). These lubricants, antistatic agents, etc., are not always 100% pure and may contain, in addition of the main component, impurities such as isomers, unreacted materials, side-reaction products, decomposed materials, oxides, etc. The content of these impurities are preferably not more than 30% by weight, and more preferably not more than 10% by weight.

The lubricants and the surface active agents each has a different physical action, and the kind and the amount thereof and the using ratio of, the lubricant together generating a synergistic effect shall be most suitably determined according to the purposes. It is considered that fatty acids each having a different melting point are used for the lower layer and the magnetic layer to control oozing them onto the surfaces, esters each having different boiling point and melting point are used for both the layers to restrain oozing them onto the surfaces, by controlling the amounts of the surface active agents for both the layers, the stability of the coating materials is improved, by increasing the addition amount of the lubricant to the lower layer, the lubricating effect is improved, although, as a matter of course, the proper uses of additives are not limited to the above-described examples. In general, the total amounts of the lubricants are selected in the range of from 0.1% by weight to 50% by weight, and preferably from 2% by weight to 25% by weight.

Also, all or a part of the additives may be added to any step of the productions of the magnetic coating material and the non-magnetic coating material. For example, there are the case of mixing with the ferromagnetic powder before the kneading step, the case of adding in the kneading step of the ferromagnetic metal powder, the binder, and the organic solvent, the case of adding in the dispersing step, the case of adding after dispersing, the case of adding immediately before coating, etc. Also, if desired, after calender treatment (a heat-press treatment by calender rolls) or after finishing slit, the surface of the magnetic layer can be coated with a lubricant.

As the organic solvents, which is used in the above-described processes, known solvents can be used, and. for example, the solvents described in Japanese Patent Laid-Open No. 68453/1994 can be used.

Layer Construction

The layer construction of the magnetic disk is explained in more detail.

In the thickness construction of the magnetic disk of the invention, the thickness of the support is from 2 to 100 µm, and preferably from 2 to 80 µm.

For improving the adhesion between the support and the lower layer, an undercoat layer may be formed on the support. The thickness of the undercoat layer of the magnetic disk is from 0.01 to 0.5 µm and preferably from 0.02 to 0.5 µm. The invention may be a double-side magnetic layer disk medium having formed the lower layer and the magnetic layer on both surfaces of the support or may be a disk medium having formed these layers on one surface only of the support. In the latter case, for obtaining the effects of the static prevention and the curling correction, a back coat layer may be formed on the opposite surface of the support to the lower layer and magnetic layer side. The thickness of the back coat layer is from 0.1 to 4 µm, and preferably from 0.3 to 2.0 µm. As these undercoat layer and back coat layer, known materials can be used.

The thickness of the magnetic layer of the medium of the invention is from 0.02 to 0.5 µm. and preferably from 0.02 to 0.5 µm. The magnetic layer may be separated into two or more layers each having different magnetic characteristics and the constructions about known double layer magnetic layer can be applied. In this case, the thickness of the sum total of the double layers may be in the above-described range.

The thickness of the lower layer of the medium of the invention is usually from 0.2 to 5.0 µm, preferably from 0.3 to 3.0 µm, and more preferably from 1.0 to 2.5 µm. In addition, when the lower layer of the medium of the invention is substantially non magnetic, the effects thereof are obtained, and even when the lower layer contains a small amount of a magnetic substance as impurities or intentionally, the lower layer shows the effects of the invention and as a matter of course, such a construction can be said to be the substantially same constriction as that of the invention.

Support

The support used for the magnetic disk is preferably non magnetic. As the support, known films of polyesters such as polyethylene terephthalate, polyethylene naphthalate, etc; polyolefins, cellulose triacetate, polycarbonate, polyamide (including aliphatic polyamide and aromatic polyamides such as Aramid, etc.), polyimide, polyamideimide, polysulfone, polybenzoxazole, etc., can be used. Also, if necessary, for changing the surface roughness of the magnetic surface from that of the base surface, the laminated layer type support disclosed in Japanese Patent Laid-Open No. 224127/1991 can be used. These supports may be previously subjected to a corona discharging treatment, a plasma treatment, an easily adhesion treatment, a heat treatment, a dust-removing treatment, etc. Also, as the support of the invention, an aluminum or glass substrate can be applied.

For the magnetic disk of the invention, it is preferred to use the support having the centerline average surface roughness (Ra) measured by a MIRAU method of TOPO-3D manufactured by WYKO Co. is not larger than 8.0 nm, preferably not larger than 4.0 nm, and more preferably not larger than 2.0 nm. It is preferred that the support has not only the small as centerline surface roughness but also does not have coarse projections of larger than 0.5 µm. Also, the roughness form of the surface is freely controlled by the size and the amount of the filler added to the support. As examples of these fillers, there are the oxides or the carbonates of Ca, Si, Ti, etc., and also organic fine powders of an acrylic compounds.

It is preferred that the maximum height SRmax of the support is not higher than 1 µm, the ten-point mean roughness SRz is not larger than 0.5 µm, the center plane dent depth SRv of not deeper than 0.5 µm, the center plane area ratio SSr of at least 10% and not higher than 90%, and mean wavelength Sλa of at least 5 µm and not longer than 300 µm.

For obtaining the desired electromagnetic characteristics and the durability, the surface projection distribution of the support can be desirably controlled by a filler and the projections of the sizes of from 0.01 µm to 1 µm can be controlled in the range of from 0 to 2000 projections per 0.1 $mm^2$.

The F-5 value of the support is preferably from 5 to 50 $kg/mm^2$ (49 to 490 MPa), and the heat shrinkage factor of the support at 100° C. for 30 minutes is preferably not higher than 1% and more preferably not higher than 0.5%. Also, it is preferred that the breaking strength of the support is from 5 to 100 kg/mm² (49 to 980 MPa) and the elastic modulus is from 100 to 2000 kg/mm² (980 to 10600 MPa). The thermal expansion coefficient is from $10^{-4}$ to $10^{-8}$/° C. The humidity expansion coefficient is not higher than $10^{-4}$/RH %, and preferably not higher than $10^{-5}$/RH %. It is preferred that these thermal characteristics, the dimensional characteristics, and the mechanical characteristics of the support are almost same to It each direction in the plane at the difference of within 10%.

Production Method Of Magnetic Disk

The process of producing the magnetic coating material or the lower layer coating material of the magnetic disk of the invention is comprised of at least a kneading step, a dispersing step, and, if necessary, a mixing a step formed before and after these steps. Each step may be separated into two or more stages.

The raw materials, such as the ferromagnetic metal powder, the non-magnetic powder, the binder, carbon black, the abrasives, the antistatic agent, the lubricant, the solvents, etc., may be added first or during any step. Also, each raw material may be added in two or more separated steps. For example, polyurethane may be separately added at the kneading step, the dispersing step, and a mixing step for viscosity control after dispersing.

Conventionally known production techniques can be used as the steps of a part. In the kneading step, it is preferred to use a kneading means having a strong kneading power, such as an open kneader, a continuous kneader, a pressure kneader, an extruder, etc. In the case of using the kneader, the magnetic powder or the non-magnetic powder and all the binders or a part of the binders (at least 30% by weight of all the binders is preferred), are kneaded in the range of from 15 to 500 parts by weight to 100 parts by weight of the ferromagnetic powder. Details of the kneading treatment are described in Japanese Patent Laid-Open Nos. 106338/1989 and 79274/1989.

Also, for dispersing the coating material of the magnetic layer and the coating material of the lower layer, glass beads can be used but zirconia beads, titania beads, and steel beads, which are dispersing media having a high specific gravity, are suitable. The particle sizes and the packing ratio of these dispersing media are optimized at use. As the dispersing machine, a known one can be used.

In the case of coating the coating materials for producing the magnetic disk of a double layer construction of the invention, the following systems are preferably used.

In a first method, the coating layer of the lower layer is coated on a support by a gravure coating apparatus, a roll coating apparatus, a blade coating apparatus, an extrusion coating apparatus, etc., which is generally used for coating a magnetic coating material, and then while the coated layer of the lower layer is in a wet state, the coating layer of the upper layer is coated thereon by a support-press type extrusion coating apparatus disclosed in Japanese Patent Examined Publication No. 46186/1989 or Japanese Patent Laid-Open Nos. 238179/1985 and 26572/1990.

In a second method, the coating layers of the upper and lower layers are almost simultaneously coated on a support by one coating head having therein two coating liquid-passing slits as disclosed in Japanese Patent Laid-Open Nos. 88080/1988, 17971/1990, and 265672/1990.

In the third method, the coating layers of the upper and lower layers are almost simultaneously coated on a support by an extrusion coating apparatus equipped with a back up roll disclosed in Japanese Patent Laid-Open No. 174965/1990.

In addition, for preventing lowering of the electromagnetic characteristics of the magnetic disk by the aggregation of the magnetic particles, it is desirable to impart shearing to the coating liquid in the inside of a coating head by the method disclosed in Japanese Patent Laid-Open No. 95174/1987 or 236968/1989.

Furthermore, it is preferred that the viscosity of the coating liquid satisfies the numeral range disclosed in Japanese Patent Laid-Open No. 8471/1991.

For realizing the layer construction of the magnetic disk, a successive double layer coating method in which after coating and drying the lower layer, the magnetic layer is formed thereon, can be used and by using the method, the effects of the invention are not lost. However, for reducing the coating defects and improving the quality of not causing drop out, it is preferred to use the above-described simultaneous double layer coating method.

A magnetic disk is sometimes imparted with a sufficient isotropic orientation even by not oriented without using an orienting apparatus but it is preferred to use a known random orienting apparatus such as by obliquely and alternately disposing cobalt magnets or by applying an AC magnetic field by a solenoid. The isotropic orientation is generally preferred two-dimensional random orientation in plane, but by giving a perpendicular component to make three-dimensional random orientation. Also, by using spin coat, circular orientation may be applied.

In the above-described coating process, it is preferred that the drying position of the coated films can be controlled by controlling the temperature and the amount of blast of the drying blast and the coating speed, it is preferred that the coating speed is from 20 to 1000 m/minute and the temperature of the drying blast is at least 60° C., and also before entering the orientation step, proper previous drying can be carried out.

As the calender treatment rolls, plastic rolls having a heat resistance of an epoxy resin, polyimide, polyamide, polyimideamide, etc., or metal rolls are used, but particularly, in the case of forming double side magnetic layers, it is preferred to treat the magnetic medium by metal rolls. The treatment temperature is preferably at least 50° C., and more preferably at least 100° C. The linear pressure is preferably at least 1960 N/cm (200 kg/cm), and more preferably at least 2940 N/cm (300 kg/cm).

After calender treatment, the magnetic medium is punched into a disk form, after applying the treatment of the invention as described above, the disk formed is placed in a cartridge having formed a liner at the inside walls, and added with definite parts to produce the magnetic disk. However, if necessary, after punching into the disk form, the disk is subjected to a thermo treatment at a high temperature (usually 50 to 90° C.), whereby the hardening treatment of the coated layers may be accelerated.

Physical Characteristics

The saturation magnetic flux density of the magnetic layer of the magnetic disk is usually 0.2 to 0.6 tesla (2000 to 6000 Gauss). The distribution of the coercive force is preferably as narrow as possible, and SFD and SFDr are preferably not higher than 0.6. The squareness ratio is usually from 0.45 to 0.55 in the random orientation, and is from 0.6 to 0.67 in the case of the two-dimensional random orientation. In the case of applying a perpendicular orientation, the ratio of usually at least 0.5.

The friction coefficient of the magnetic disk to a head is preferably not higher than 0.5, and more preferably not higher than 0.3 in the ranges of the temperature of from −10° C. to 40° C. and the humidity of from 0% to 95%, the surface specific resistance of from $10^4$ to $10^{12}$ ohms/square in the magnetic plane, and the charged potential is preferably in the range of from −500 V to +500 V.

The modulus of elasticity of the magnetic layer at 0.5% elongation is preferably from 100 to 2000 kg/mm² (980 to 19600 MPa) in each direction in plane, the breaking strength is preferably from 10 to 70 kg/mm² (98 to 686 MPa), the modulus of elasticity of the magnetic disk in each direction in plane is preferably from 100 to 1500 kg/mm² (980 to 1470 MPa), the residual elongation is preferably not higher than 0.5%, and the thermal shrinkage factor at all temperature lower than 100° C. is preferably not higher than 1%, more preferably not higher than 0.5%, and more preferably not higher than 0.1%. The glass transition temperature (the maximum point of the loss elastic modulus of the dynamic viscoelasticity measurement measured at 110 Hz) of the magnetic layer is preferably at least 50° C. and not higher than 120° C., and that of the lower layer is preferably from 0° C. to 100° C. The loss elastic modulus is It preferably in the range of from $1 \times 10^7$ to $8 \times 10^8$ N/m², and the loss tangent is preferably not higher than 0.2%. When the loss tangent is too large, a sticking trouble is liable to occur. It is preferred that these thermal characteristics and mechanical characteristics are almost same in each direction It in plane within 10%. The residual solvent contained in the magnetic layer is preferably not more than 100 mg/m², and more preferably not more than 10 mg/m². The voids of the coated layers are not more than 30% by volume, and more preferably not more than 20% in both the lower layer and the magnetic layer. The voids are preferably as small as possible for obtaining a high output but according to the purposes, there is a case that it is better to insure a certain value of the voids.

The Rz of the magnetic layer is at least 20 nm and not larger than 50 nm, and preferably from 20 nm and not larger than 30 nm, and in the case of the measurement range of 121 μm×92 μm, the center plane average surface roughness (Ra) of the magnetic layer is preferably not larger than 5.0 nm, more preferably not larger than 4.5 nm, and far more preferably not larger than 2.0 nm.

They can be easily controlled by the control of the surface property of the support by the filler, the particle sizes and the amount of the powder added to the magnetic layer, and the surface form of the rolls by the calender treatment. The curl is preferably within ±3 mm.

In the magnetic disk, according to the purposes, these physical characteristics can be changed in the lower layer and the magnetic layer. For example, the modulus of elasticity of the magnetic layer is increased to improve the running durability and at the same time, the modulus of elasticity of the lower layer is lowered than that of the magnetic layer to improve touching of the magnetic disk to a head.

Then, practical examples of the present invention are explained but the invention is not limited to them. In addition, all "parts" described below, unless otherwise indicated, are "by weight".

Example 1

<Support>
Support B1 (Polyethylene terephthalate)

| | |
|---|---|
| Thickness | 62 μm |
| Contained filer: Particle size 0.2 μm, $SiO_2$, 4% by weight | |

Support B2 (Polyethylene terephthalate)

| | |
|---|---|
| Thickness | 62 μm |
| Contained filer: Particle size 0.2 μm, $SiO_2$, 4% by weight | |

Support B3 (Polyethylene terephthalate)

| | |
|---|---|
| Thickness | 62 μm |
| Contained filer: Particle size 0.2 μm, $SiO_2$, 4% by weight | |

Support B4 (Polyethylene terephthalate)

| | |
|---|---|
| Thickness | 62 μm |
| Contained filer: Particle size 0.2 μm, $SiO_2$, 10% by weight | |

Support B5 (Polyethylene terephthalate)

| | |
|---|---|
| Thickness | 62 μm |
| Contained filer: Particle size 0.2 μm, $SiO_2$, 15% by weight | |

<Non-magnetic coating material>
Non-magnetic coating material U1

| | |
|---|---|
| Titanium oxide | 100 parts |
| Mean particle size: 0.035 μm | |
| Specific area by BET method: 40 m²/g | |
| pH: 7 | |
| $Al_2O_3$ exists on the surface at 8% by weight to all particles | |
| Carbon black | 25 parts |
| Mean particle size: 0.03 μm | |
| Vinyl chloride copolymer | 16 parts |
| MR110 (made by ZEON CORPORATION) | |
| Polyurethane resin | 7 parts |
| UR8200 (made by TOYOBO CORPORATION, LTD.) | |
| Phenylphosphonic acid | 4 parts |
| Butyl stearate | 3 parts |
| Butoxyethyl stearate | 3 parts |
| Isohexadecyl stearate | 3 parts |
| Stearic acid | 1 part |
| Oleic acid | 1 part |
| Methyl ethyl ketone | 110 parts |
| Cyclohexanone | 190 parts |

<Preparation of magnetic coating material>
(Magnetic coating material M1)

| | |
|---|---|
| Ferromagnetic metal powder | 100 parts |
| Composition: | |
| Fe/Co = 70/30 (atomic ratio) | |
| Al/Fe = 13 atom % | |
| Y/Fe = 6 atom % | |
| Hc: 183.1 kA/m (2300 Oe) | |
| Mean long axis length: 0.08 μm | |
| Crystallite size: 110 angstroms | |
| σs: 130 A · m²/kg (emu/g) | 10 parts |
| Vinyl chloride copolymer | 10 parts |
| MR110 (made by ZEON CORPORATION) | |
| Polyurethane resin | 5 parts |
| UR8200 (made by TOYOBO CORPORATION, LTD.) | |
| α-Alumina (mean particle size: 0.15) | 5 parts |
| Carbon black (mean particle size 0.1 μm) | 2 parts |
| Phenylphosphonic acid | 2 parts |
| Butyl stearate | 3 parts |
| Butoxyethyl stearate | 3 parts |
| Isohexadecyl stearate | 3 parts |
| Stearic acid | 1 part |
| Oleic acid | 1 part |
| Methyl ethyl ketone | 180 parts |
| Cyclohexanone | 110 parts |

About each of the coating materials described above, after kneading the components by kneader, the kneaded mixture was dispersed by a sand mill using zirconia beads. To the dispersion obtained was added polyisocyanate in an amount of 6 parts to the coating liquid for the lower layer and 5 parts to the coating liquid for the magnetic layer, after further adding 40 parts of cyclohexanone to each coating liquid, each coating liquid was filtered using a filter having a mean pore size of 1 μm to prepare the coating liquid for forming the lower layer and the coating liquid for forming the magnetic layer.

The coating liquid for the lower layer obtained was coated on each support at a dry thickness of 1.5 μm. and the coating liquid for the magnetic layer was coated thereon at a definite thickness by a simultaneous double coating method, and while both layers were in the wet states, the support having the coated layers was passed through the inside of an AC magnetic field generating apparatus at a frequency of 50 Hz and a magnetic field intensity of 0.025 T (250 Gauss) to carry out a random orientation treatment. Another surface of the support was similarly coated and oriented, after drying, a treatment was applied by a calender of 7 stages at a temperature of 90° C. and a linear pressure of 2940 N/cm (300 kg/cm), after punching into 3.5 inch disk and surface polishing treating, the disk was placed in a cartridge of 3.5 inches having formed a liner at the inside walls, and was equipped with definite parts to obtained a 3.5 inch floppy.

In addition, a support containing a $SiO_2$ filler having a particle size of 0.5 μm in an amount of 2% by weight to polyethylene terephthalate was defined to a support B2, and a support containing a $SiO_2$ filler having a particle size of 0.2 μm in an amount of 2% by weight to polyethylene terephthalate was defined to a support B3.

A non-magnetic coating material having the same composition as the non-magnetic coating material U1 except that the non-magnetic powder of the non-magnetic coating material U1 was changed to an α-$Fe_2O_3$ hematite (mean long axis length: 0.08 μm, specific area by a BET method: 60 m²/g, pH: 9, acicular ratio: 6, and $Al_2O_3$ existed on the surface in an amount of 8% by weight to all the particles) was defined to be a non-magnetic coating material U2.

A non-magnetic coating material having the same composition as the non-magnetic coating material U1 except that the non-magnetic powder of the non-magnetic coating material U1 was changed to an α-$Fe_2O_3$ hematite (mean long axis length: 0.15 μm, specific area by a BET method: 40 m²/g, pH: 9, acicular ratio: 6, and $Al_2O_3$ existed on the surface in an amount of 8% by weight to all the particles) was defined to be a non-magnetic coating material U3.

A magnetic coating material having the same composition as the magnetic coating material M1 except that the crystallite size of the ferromagnetic metal powder was 180 angstroms was defined to be a magnetic coating material M2.

A magnetic coating material having the same composition as the magnetic coating material M1 except that the amount of the vinyl chloride copolymer was changed to 8 parts and the amount of the polyurethane resin was changed to 4 parts was defined to be a magnetic coating material M3.

A magnetic coating material having the same composition as the magnetic coating material M1 except that the amount of the vinyl chloride copolymer was changed to 12 parts and the amount of the polyurethane resin was changed to 6 parts was defined to be a magnetic coating material M4.

A magnetic coating material having the same composition as the magnetic coating material M1 except that the particle size of carbon black was changed to 0.05 μm was defined to be a magnetic coating material M5.

A magnetic coating material having the same composition as the magnetic coating material M1 except that the particle size of carbon black was changed to 0.05 μm and the amount thereof was changed to 4 parts was defined to be a magnetic coating material M6.

A magnetic coating material having the same composition as the magnetic coating material M1 except that the particle size of carbon black was changed to 0.2 μm was defined to be a magnetic coating material M7.

A magnetic coating material having the same composition as the magnetic coating material M1 except that the kneaded mixture was dispersed by glass beads was defined to be a magnetic coating material M8.

A magnetic coating material having the same composition as the magnetic coating material M1 except that the magnetic substance of the magnetic coating material M1 was changed to a barium ferrite magnetic substance having a plate diameter of 24 nm, a plate form ratio of 3, the Hc of 199 kA/m (2500 Oe) and the σs of 55 A·m²/kg (emu/g) was defined to be a magnetic coating material M9.

Examples 2 to 5 and Comparative Examples 1 to 11

By following the same procedure as Example 1 using each of the supports, the nonmagnetic coating materials, and the magnetic coating materials as described above, and by the combination shown in Table 1, each magnetic disk was prepared, the performance of each magnetic disk was evaluated by following measurement methods, and the results are shown in Table 1. In addition, in Comparative Example 9, Rz is 17 nm, whereby the projections of at least 20 nm become inevitably 0. In Example 11, the projections of at least 20 nm exceed the upper limit of those of the invention and Rz simultaneously exceeds the upper limit because it becomes difficult to independently control the number of projections and Rz.

Measurement Methods (1) Durability: A signal was recorded on the magnetic disk and the disk was run by a Zip drive in a thermocycle environment with the following flow as one cycle.

Thermocycle Flow

25° C., 50% RH 1 hour→(temperature raising 2 hours)
→60° C., 20% RH 7 hours→(temperature lowering 2 hours)
→25° C., 50% RH 1 hour→(temperature lowering 2 hours)
→5° C., 10% RH 7 hours→(temperature raising 2 hours)
→<repeat the cycle flow>.

(2) Number of projections: About the projections having a height of at least 20 nm, the number of the projections in the area pf 30 μm×30 μm was measured using an atomic force microscope (AFM) NanoScope III manufactured of Digital Instrumental Co. The measurement was carried out at optional five portions and the averaged value of the values was defined as the number of projections.

(3) Rx: Using TOPO-3D manufactured by WYKO Co., ten projections were selected in order of height by the MIRAU method in the area of 250 μm×250 μm and the mean value was obtained. The measurement was carried out at optional five portions and the averaged value of the values was defined as Rz.

(4) HF output: The output of Example 1, in which the signal of a recording wavelength of 0.5μ was recorded and reproduced, age was defined as a standard and other outputs were determined by dB.

TABLE 1

| | Support | Non-magnetic Lower Layer | Magnetic Layer | Rz (nm) | No. of Projections of at least 20 nm (× 10⁵/mm²) | HF Output (dB) | Durability (Hours) |
|---|---|---|---|---|---|---|---|
| Example 1 | B1 | U1 | M1 | 40 | 1.2 | 0.0 | >500 |
| C. Ex. 1 | B2 | U1 | M1 | 55 | 0.4 | −1.4 | 120 |
| C. Ex. 2 | B3 | U1 | M1 | 34 | 0.7 | 1.0 | 290 |
| Example 2 | B1 | U2 | M1 | 29 | 3.4 | 2.1 | >500 |
| C. Ex. 3 | B1 | U3 | M1 | 52 | 2.1 | −1.2 | >500 |
| C. Ex. 4 | B1 | U1 | M2 | 42 | 0.5 | 0.0 | 150 |
| Example 3 | B1 | U1 | M3 | 24 | 3.6 | 2.5 | >500 |
| C. Ex. 5 | B1 | U1 | M4 | 45 | 0.5 | −2.1 | 80 |
| C. Ex. 6 | B1 | U1 | M5 | 33 | 0.6 | 0.9 | 150 |
| Example 4 | B1 | U1 | M6 | 36 | 2.1 | 0.4 | >500 |
| C. Ex. 7 | B1 | U1 | M7 | 70 | 1.8 | −2.5 | >500 |
| C. Ex. 8 | B1 | U1 | M8 | 61 | 1.8 | −1.8 | >500 |
| Example 5 | B1 | U1 | M9 | 46 | 3.7 | 1.4 | >500 |
| C. Ex. 9 | B1 | U2 | M3 | 17 | 0 | 2.5 | 40 |
| C. Ex. 10 | B4 | U2 | M3 | 36 | 18.2 | 0.9 | >500 |
| C. Ex. 11 | B5 | U2 | M3 | 52 | 25.4 | −1.4 | >500 |

C. Ex.: Comparative Example
>500 = 500 hours or longer

From the above table, it can be seen that the examples of the invention are excellent in the durability.

By the present invention, the magnetic disk excellent in both the electromagnetic characteristics and the running durability can be provided.

This application is based on Japanese patent application JP 2000-363004, filed Nov. 29, 2000, the entire content of which is hereby incorporated by reference, the same as if set forth at length.

What is claimed is:

1. A magnetic disk comprising a support, a substantially non-magnetic lower layer, and a magnetic layer containing at least one of a ferromagnetic metal powder and a hexagonal ferrite powder and a binder, wherein the magnetic layer has a thickness of 0.02 μm to 0.5 μm, a surface having a ten-point mean height Rz measured by a non-contact surface roughness profiler of 20 nm to 50 nm, and a number of projections having a height of at least 20 nm measured by AFM of $1 \times 10^5/\text{mm}^2$ to $2 \times 10^6/\text{mm}^2$.

2. The magnetic disk according to claim 1, wherein the number of projections having a height of at least 20 nm measured by AFM is $3 \times 10^5/\text{mm}^2$ to $1 \times 10^6/\text{mm}^2$.

3. The magnetic disk according to claim 1, wherein Rz is 20 nm to 30 nm.

4. The magnetic disk according to claim 1, wherein the magnetic layer contains carbon black having a mean particle size of 0.04 μm to 0.12 μm.

5. The magnetic disk according to claim 1, wherein the ferromagnetic metal powder has a crystallite size of 80 angstroms to 160 angstroms.

6. The magnetic disk according to claim 1, wherein the magnetic layer contains the binder in an amount of 10 to 22 parts by weight based on the ferromagnetic metal powder.

7. The magnetic disk according to claim 1, wherein the at least one of a ferromagnetic metal powder and a hexagonal ferrite powder is dispersed in the binder.

8. The magnetic disk according to claim 1, wherein the magnetic layer has a coercive force (Hc) of at least 143.3 kA/m.

9. The magnetic disk according to claim 1, wherein the magnetic layer has a centerline average surface roughness (Ra) by a 3D-MIRAU method of 0.5 to 7.0 nm.

10. The magnetic disk according to claim 1, wherein the lower layer has a thickness of 0.2 to 5.0 μm.

* * * * *